(12) United States Patent
Morales et al.

(10) Patent No.: US 11,339,836 B2
(45) Date of Patent: May 24, 2022

(54) MECHANISM AND METHOD TO ENGAGE/DISENGAGE A SPRAG CLUTCH BASED ON COEFFICIENTS OF THERMAL EXPANSION

(71) Applicant: Bell Textron Inc., Fort Worth, TX (US)

(72) Inventors: Gilberto Morales, Arlington, TX (US); Carlos Alexander Fenny, Fort Worth, TX (US); Cody Anderson, Lantana, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 16/926,451

(22) Filed: Jul. 10, 2020

(65) Prior Publication Data
US 2022/0010848 A1    Jan. 13, 2022

(51) Int. Cl.
| | |
|---|---|
| *F16D 41/07* | (2006.01) |
| *B64D 35/00* | (2006.01) |
| *F16D 41/08* | (2006.01) |
| *F16D 43/25* | (2006.01) |
| *F16D 41/06* | (2006.01) |

(52) U.S. Cl.
CPC .............. *F16D 41/07* (2013.01); *B64D 35/00* (2013.01); *F16D 41/084* (2013.01); *F16D 43/25* (2013.01); *F16D 2041/0603* (2013.01); *F16D 2300/021* (2013.01); *F16D 2300/04* (2021.01)

(58) Field of Classification Search
CPC .................. F16D 41/07; F16D 41/084; F16D 2041/0603; F16D 43/25; F16D 2300/021; F16D 2300/04; B64D 35/00; B64D 35/08

USPC ...................................... 192/45.1, 41 A, 82 T
See application file for complete search history.

(56) References Cited

U.S. PATENT DOCUMENTS

| | | | |
|---|---|---|---|
| 3,730,316 A | * | 5/1973 | Zimmer ................... F16D 41/07 192/41 A |
| 4,756,395 A | | 7/1988 | Zlotek |

FOREIGN PATENT DOCUMENTS

JP    2009024832 A    *    2/2009    ............. F16D 43/25

OTHER PUBLICATIONS

"Formsprag Clutch provides superior overrunnning clutch technologies for challenging industrial applications worldwide", https://www.formsprag.com/, Captured 7 pages, Screenshot of webpage captured Jul. 10, 2020.

* cited by examiner

*Primary Examiner* — Richard M Lorence
(74) *Attorney, Agent, or Firm* — Lightfoot & Alford PLLC

(57) ABSTRACT

A clutch has an inner race, an outer race spaced from the inner race and forming a radial cavity between the races, and a plurality of sprags disposed in the radial cavity. The sprags have a different coefficient of thermal expansion (CTE) from the inner race, the outer race, or both races, and a sprag cage retains the sprags at a uniform spacing within the radial cavity. When the clutch is at a first temperature, a gap exists between the sprags and the inner race, between the sprags and the outer race, or between the sprags and both races, and the clutch is disengaged. When the clutch is at a second temperature the sprags are in contact with both the races, and the clutch is engaged.

20 Claims, 4 Drawing Sheets

MECHANISM AND METHOD TO ENGAGE/DISENGAGE A SPRAG CLUTCH BASED ON COEFFICIENTS OF THERMAL EXPANSION

CROSS-REFERENCE TO RELATED APPLICATIONS

Not Applicable.

BACKGROUND

Sprag clutches are used to transfer torque between a driving member, such as a clutch outer race, and a driven member, such as a transmission. Sprag clutches typically comprise a cylindrical outer race and a cylindrical inner race and a plurality of sprags positioned between the outer race and the inner race. The plurality of sprags are typically retained in the radial space between the two races by a sprag cage. A sprag clutch is sometimes referred to as an overrunning clutch or a freewheeling clutch.

In the typical configuration, either the inner race or the outer race rotates until the sprags are wedged into place. This configuration allows for torque to be transferred between the inner and outer races. For example, if the inner race and sprags are rotating at a first speed and the sprags are then wedged into the outer race, then the outer race begins to rotate at the same speed and transfer torque to a driven member. Once the driven member begins to rotate faster than the inner race, the sprags slip free and the inner race rotates independent of the outer race. An alternative to the example is when the driven member is rotating at a desired speed, the inner race is rotated relatively slower than the outer race in order to free the sprags and decouple the races. Other means to engage or disengage the sprag clutch include using hydraulic pressure to move the clutch components until the sprags engage or disengage. Existing sprag clutch designs try to reduce friction and wear of the clutch by moving the sprags away from either the inner race or the outer race.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

This disclosure describes a sprag clutch that engages or disengages in response to temperature variations. The ability to engage or disengage is based upon the sprag clutch's inner race, outer race, and/or sprags being made of materials having different coefficients of thermal expansion (CTE). This allows for a thermally responsive sprag clutch to improve engaging and disengaging sprag clutches over the known art.

Figure 1:
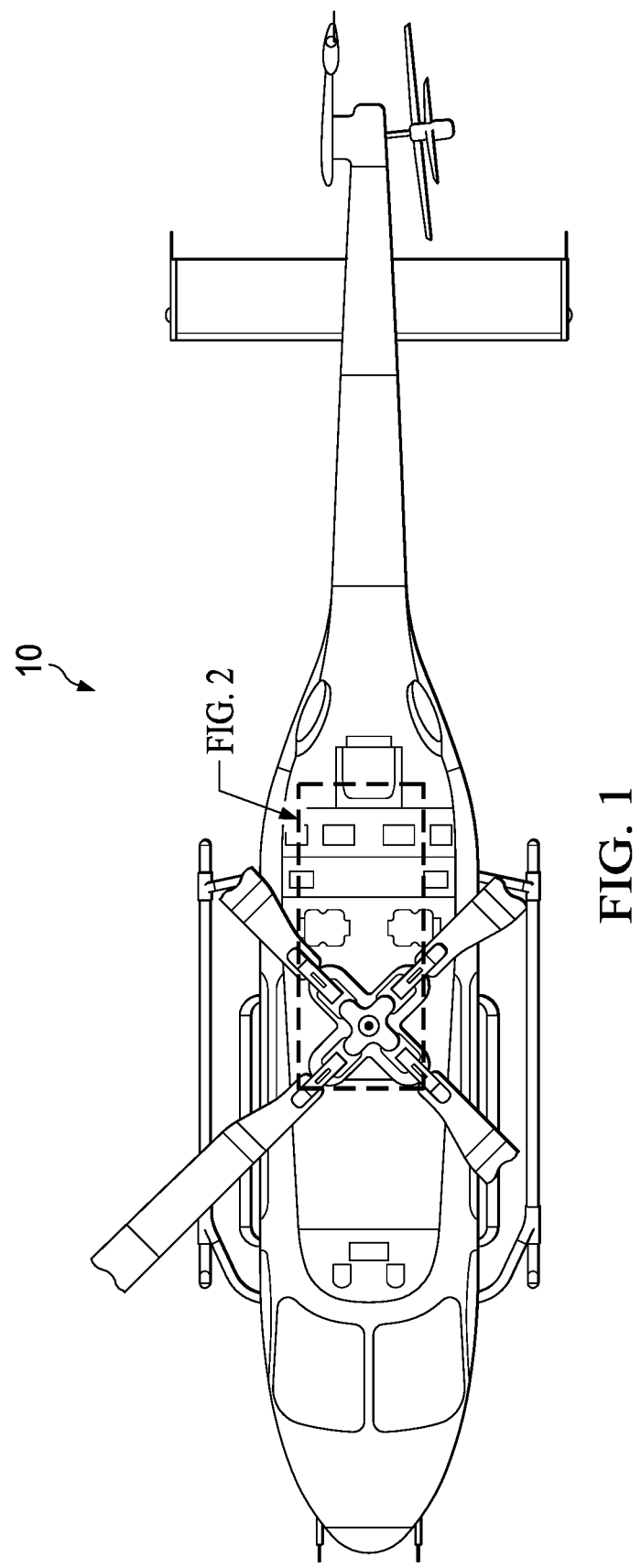
FIG. 1 is a top view of a two-engine rotary aircraft comprising a clutch according to this disclosure.
Figure 2:
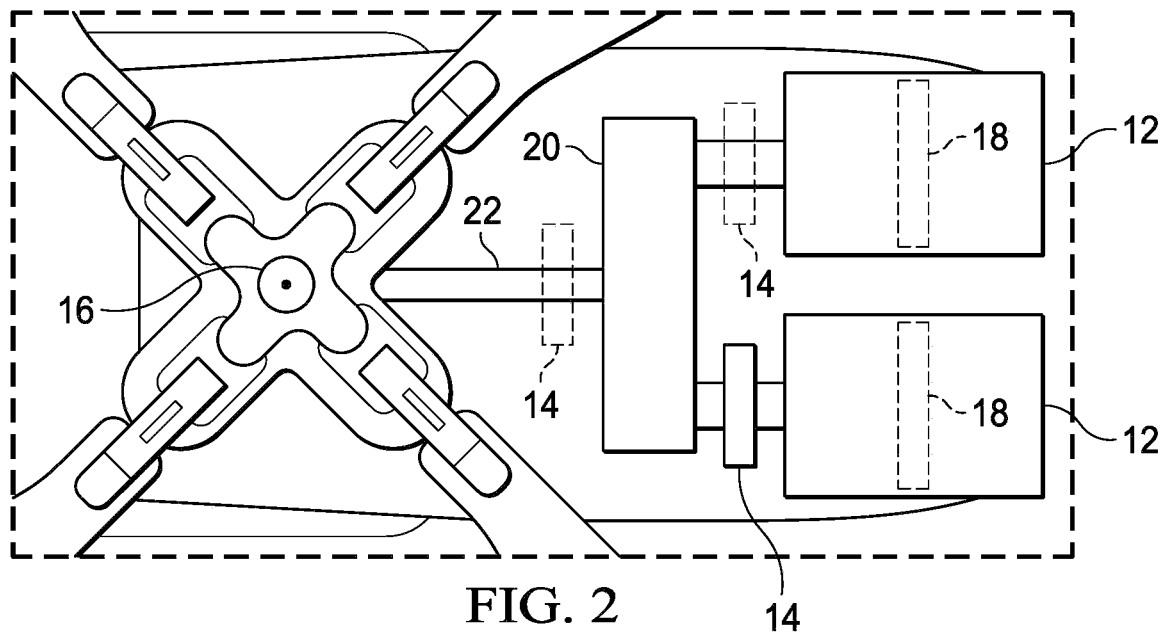
FIG. 2 is a schematic top view of a two-engine configuration of the aircraft of FIG. 1.

For illustration of the disclosed invention, a non-limiting example of the sprag clutch being used on an aircraft is provided. Referring to FIGS. 1 and 2, the aircraft illustrated is a rotary aircraft having two engines, though sprag clutches according to this disclosure may be used in aircraft having more or fewer engines and in other appropriate applications.

In existing sprag clutches, the inner and outer races rotate with the sprags in one direction. The sprags are designed to engage or disengage between the inner and outer races. The sprags disengage when the inner race rotates slower than the outer race. In this mode, torque does not transfer between these inner and outer races. When the inner clutch rotates as fast or faster than the outer race, the sprags engage between the inner and outer races. This engagement occurs as each sprag rotates within the clutch about an axis of rotation that is perpendicular to its longitudinal axis until it wedges between the inner and outer races. In the second mode, torque transfers between the inner and outer races. The inner race, the outer race, and the sprags of an existing sprag clutch are made from similar materials and have a relatively uniform coefficient of thermal expansion (CTE), and the sprag clutch relies on the rotation of the sprags to engage and disengage the clutch.

Like existing sprag clutches, sprag clutches according to this disclosure also include an inner race, an outer race, and a plurality of sprags, collectively referred to as the components. Unlike existing sprag clutches, at least one of the components must be of a material that has a different CTE from the other components to provide for engaging and disengaging the clutch. In some embodiments, at least two of the components have similar or identical CTEs, and these two components will have a CTE different from the remaining component. In other embodiments, each component may have a CTE that is different than for the other two components.

The inner race, the outer race, and the sprags can be of a material selected from the group consisting of metal, composites, ceramics, and combinations thereof. There can be any number of combinations of materials used for the sprags, the inner race, and the outer race.

Different material properties and CTEs allow the clutch to disengage or engage as it heats or cools. One reaction to the temperature change causes a gap to form between the plurality of sprags and the inner race and/or the plurality of sprags and the outer race. The gap prevents the sprags from becoming wedged between the races and engaging the clutch. The gap forms because the inner race, the outer race, and/or the sprags expand or contract with the temperature change to the point that the sprags do not contact the inner race or the outer race. The expansion or contraction with the changing temperatures causes the inner race and the sprags and/or the outer race and the sprags to move away from each other. The clutch is disengaged when there is a gap.

Another reaction to the temperature change eliminates the gap and engages the clutch. The gap is eliminated because the inner race, the outer race, and/or the sprags expand or contract with the temperature change to the point that the sprags are in contact with both the inner race and the outer race. The inner race and the sprags and/or the outer race and the sprags move towards each other until the sprags are in contact with both the inner and outer races. The elimination of the gap causes the sprags to become wedged between the races and engage the clutch.

Expansion or contraction of the inner race, the outer race, and the sprags is temperature dependent. The following examples highlight that there are numerous combinations of the components and possible materials that can change the impact of expansion or contraction when the clutch is subjected to temperature variations.

As used herein, low or high temperatures are defined by the CTE of the components of the clutch, and the changing temperatures define by how much the component will expand or contract. Depending upon the material properties of the component, low temperatures may be between −40° F. and +50° F. Similarly, high temperatures may be between +50° F. and +350° F. In the examples below, low temperatures of +50° F. and high temperatures of +100° F. are used.

In the following non-limiting examples, the CTE can be tailored for a specific sprag clutch performance based upon temperatures the plurality of sprags will be subjected to. Referring to Table 1 below, the steel and ceramic materials are representative CTEs from many different possible choices for steel and ceramics. Also, the IM10 composite represents a particular composite from the many other possible types of composite materials.

TABLE 1

| Material | Coefficient of Thermal Expansion, CTE (1/° F.) |
|---|---|
| Steel | 6.7E−06 |
| Ceramic | 1.1E−06 |
| IM10 Composite | −3.9E+07 |

Using the materials and CTEs from Table 1, the following examples illustrate how the different CTEs engage and disengage a sprag clutch based upon a temperature increase or decrease.

In a non-limiting example related to temperature increases, an inner race may be a metal material such as steel, the outer race may be a composite material such as an IM10 composite, and the sprags may be a ceramic material. In this example, composite material such as an IM10 composite has a negative CTE. The different CTEs of the inner race, the sprags, and the outer race will cause the components to move closer to each other with a temperature increase. When the sprags are at or above a temperature of +100° F., the CTE-based expansion of the sprags has closed the gap and the sprags are in contact with both the inner race and the outer race.

In another non-limiting example, the outer race and the sprags are of ceramic material, and the inner race is a metal material. The different CTEs of the inner race, the sprags, and the outer race will cause the sprags to close the gap at or above a temperature of +100° F., the sprags being in contact with both the inner race and outer race.

In the foregoing examples related to temperature increases, when the clutch is subjected to a change in temperature, the inner race and the sprags expand as the temperature changes more than the outer race. That is, the CTE of the inner race and the sprags causes them to expand more than the outer race, which has a different CTE. When expansion occurs, the gap between the sprags and the outer race or the sprags and the inner race is eliminated and the sprags are in contact with both the inner race and the outer race. Torque can be transferred from the clutch to the driven member when there is no gap.

In the foregoing examples related to temperature decreases, the movement of the sprags is due to the inner race and the sprags contracting more than the outer race. That is, the CTE of the inner race and the sprags react to a decreased temperature by contracting more than the outer race, which has a different CTE. When the temperature decreases and contraction occurs, a gap between the sprags and either the outer race or inner race is formed and/or increases and the sprags are not in contact with either the inner race or the outer race. The clutch will not engage and is unable to transmit torque.

With this invention, the sprag clutch can transfer torque at low or high temperatures based upon the material selection for the inner race, the outer race, and the sprags. Analysis shows that making the sprags from ceramic material provides a sufficient CTE difference to engage or disengage a clutch when the inner and outer races are made of a non-ceramic material.

In some cases, a heat exchange system may be beneficial in subjecting the clutch to a second temperature. A heat exchange system may be used to heat or cool the inner race, the sprags, and/or the outer race. A heat exchange system can be any system known to those having skill in the art and it may be attached or embedded within inner race, the sprags, and/or the outer race.

If the sprags are changed to a ceramic material from a metal, an optional heat exchange system may help cool the sprags to provide for a faster contraction and disengagement when the clutch is operating at high temperatures. In operation, the clutch may heat up due to wear and from the heat generated by the device the clutch is coupled with. In that case, the sprags will contact the inner race and outer race, and the clutch assembly will operate like a normal sprag clutch. A cooling system around the clutch assembly may be used to alter the temperature of the clutch assembly, which facilitates engaging or disengaging the sprags.

It is anticipated that it may also be desirable to alter the shape of the sprags to adjust the engagement temperature to a specific temperature range based on the different CTEs. Doing so, further improves the thermal responsiveness of the clutch with components having different material properties with different CTEs.

To illustrate the invention, a non-limiting example aircraft 10 is illustrated as a two-engine 12 rotorcraft. In one embodiment, sprag clutch 14 is inserted within the drivetrain between at least one engine 12 and the rotor hub 16. The illustrated example drivetrain includes engines 12 with each having a transmission 18. In the example, each transmission 18 is coupled to a torque combining gearbox 20 and provides torque thereto. The torque combining gearbox 20 is coupled to a driveshaft 22 providing torque input to a rotor hub 16 from the torque combining gearbox 20.

In a preferred embodiment, at least one of the engines 12 is able to function as an auxiliary power unit (APU) for providing electrical power, hydraulic pressure, and/or bleed air without rotating the other engine 12 or the rotor hub 16. For example, the engine 12 is capable of serving as an APU when clutch 14 is positioned between the engine 12 and the rotor hub 16, or between a first engine 12 and a second engine 12. Alternatively, the engine 12 is capable of serving as an APU when clutch 14 is positioned between a single engine 12 and the rotor hub 16. These non-limiting examples illustrate that the clutch 14 can be positioned at any number of locations and within any number of components in a drivetrain/powertrain of an aircraft 10.

Figure 3:
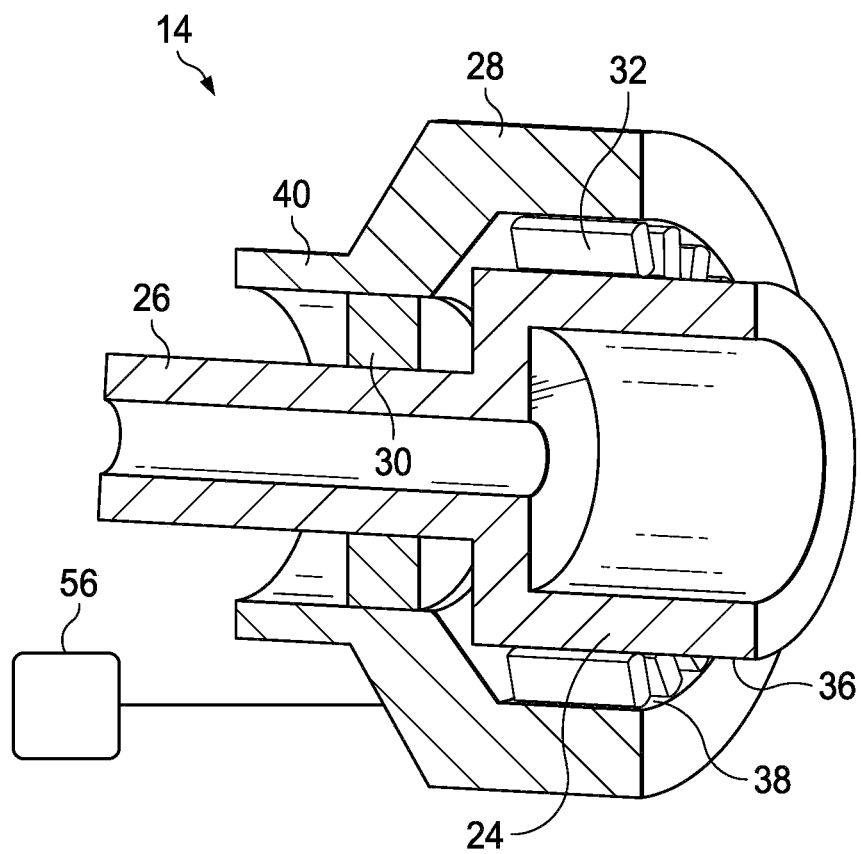
FIG. 3 is an oblique view of an embodiment of a clutch according to this disclosure.
Figure 4:
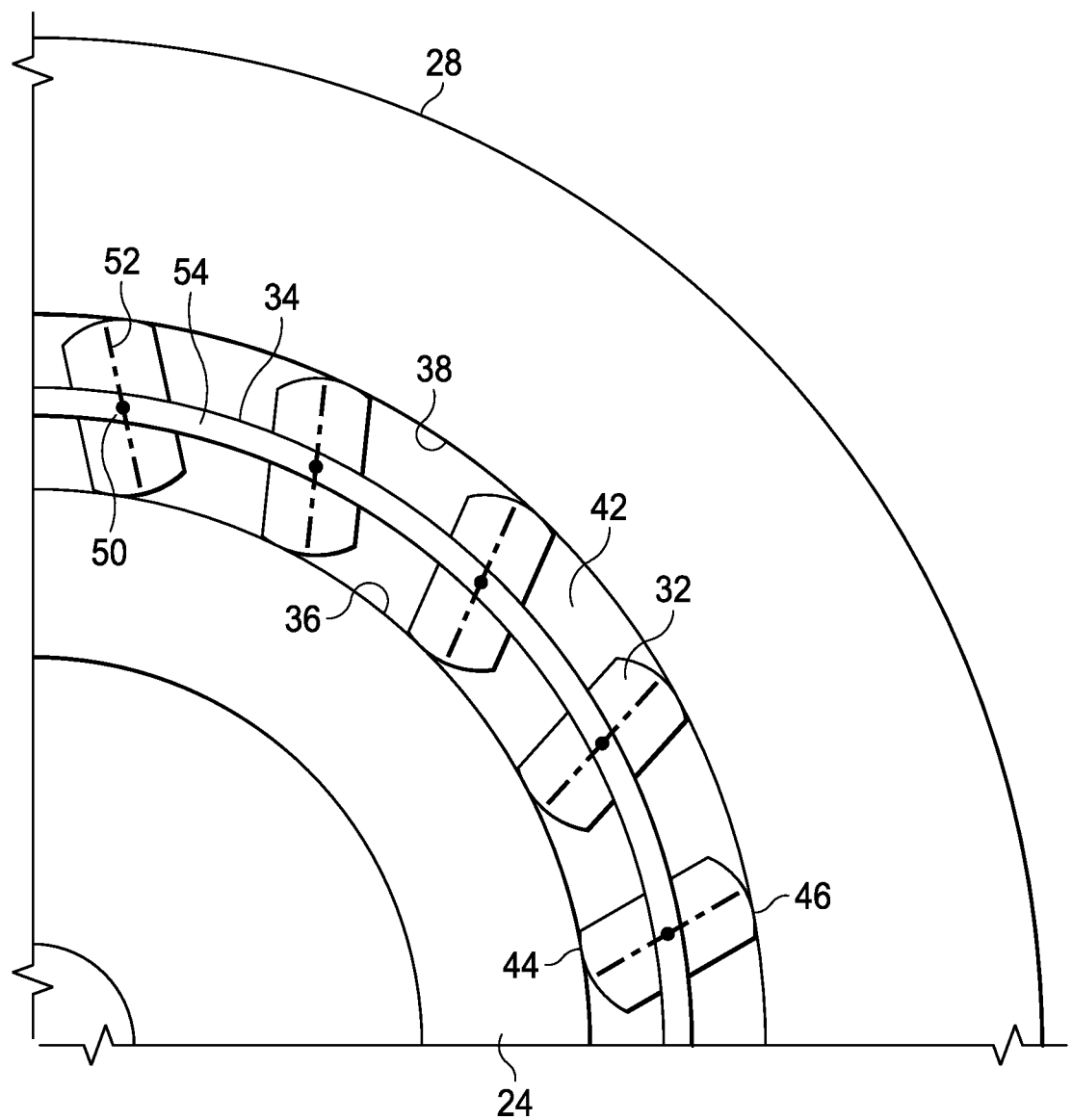
FIG. 4 is a schematic end view of the clutch of FIG. 3.
Figure 5:
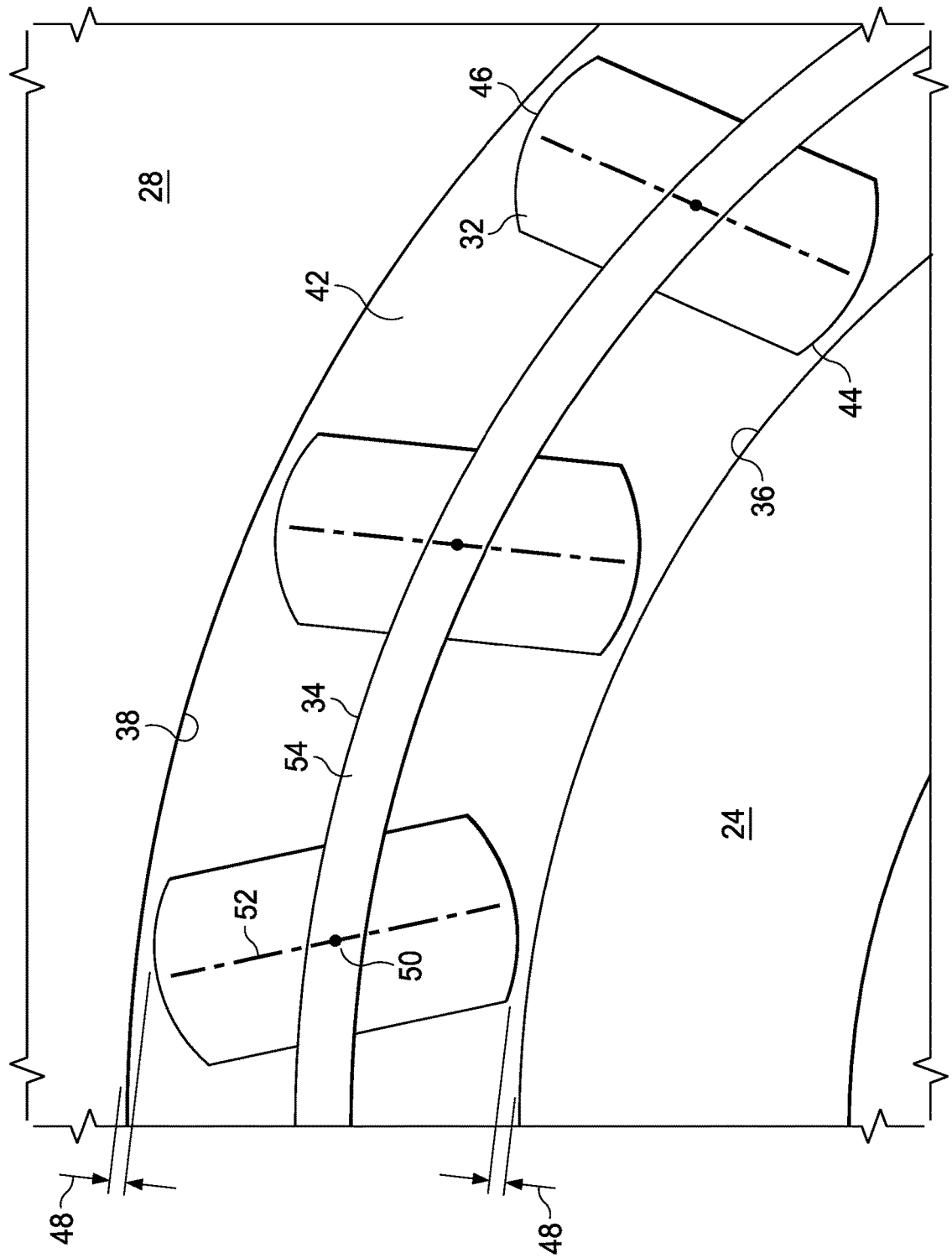
FIG. 5 is a detail view of a portion of FIG. 4.

Referring to FIGS. 3-5, the clutch 14 comprises an inner race 24, a shaft 26, an outer race 28, at least one bearing 30, a plurality of sprags 32, and a sprag cage 34. The clutch 14 is preferably an overrunning sprag clutch.

The outer race 28 is disposed about the inner race 24 and the shaft 26. The outer race 28 is rotatable relative to the inner race 24. The inner race 24 includes an outer surface 36 facing the outer race 28, and the outer race 28 includes an inner surface 38 facing the inner race 24. The clutch hub 40 extends from the outer race 28 and is positioned about the shaft 26. A radial cavity 42 is positioned between the inner race 24 and outer race 28. The plurality of sprags 32 are disposed within the radial cavity 42.

In FIGS. 3-5, the shaft 26 and at least one bearing 30 are illustrated as extending outwardly from clutch 14. However, this is only for illustration purposes. It is understood that the shaft 26 and the bearing 30 may be positioned within the clutch 14 and not extend outwardly. Additionally, the shaft 26 may be part of a separate component that the clutch 14 attaches to. These alternate embodiments are not illustrated herein, however, the disclosed invention is applicable thereto. As illustrated, the shaft 26 is rotatably coupled between the bearing 30 and the outer race 28. Additionally, the shaft 26 is illustrated as being coupled to the inner race 24.

Sprags 32 have a different material property and a different coefficient of thermal expansion (CTE) from the inner race 24, the outer race 28, or both the inner race 24 and the outer race 28. Preferably, each of the plurality of sprags 32 are of a same material, which is selected from the group consisting of a metal, a composite, a ceramic, and combinations thereof. In one embodiment, the plurality of sprags 32 are of the same material as either the inner race 24 or the outer race 28.

The plurality of sprags 32 have a sprag first end 44 and a sprag second end 46. When clutch 14 is disengaged, a gap 48 forms between at least one of the sprag first end 44 and/or sprag second end 46 and the at least one of the inner race 24 and/or the outer race 28. When clutch 14 is engaged, the gap 48 is eliminated and the sprag first end 44 is in contact with the outer surface 36 of the inner race 24 and sprag second end 46 is in contact with the inner surface 38 of the outer race 28.

In some embodiments, the sprags 32 are able to rotate within the sprag cage 34. In other embodiments, the sprags 32 are in a fixed relationship to the sprag cage 34. The sprags 32 illustrated in FIGS. 4 and 5 are each able to rotate within the sprag cage 34 about an axis of rotation 50 of each sprag 32 which is perpendicular to the sprag longitudinal axis 52.

Although the axis of rotation 50 may be anywhere in the sprag 32, preferably, the axis of rotation 50 is positioned radially along each sprag longitudinal axis 52, as illustrated in FIGS. 4 and 5. Sprag longitudinal axis 52 is oriented between sprag first end 44 and sprag second end 46. Sprags 32 may rotate about the axis of rotation 50 such that sprag 32 operates as a lever from either the sprag first end 44 or the sprag second end 46. When the sprag 32 operates as a lever, the sprag cage 34 or retaining ring 54 is positioned closer to either the inner race 24 or the outer race 28.

The sprag cage 34 is rotatably positioned between the inner race 24 and the outer race 28 within radial cavity 42. In a preferred embodiment, sprag cage 34 retains sprags 32 at a uniform spacing within the radial cavity 42 and provides a fixed point for sprags 32 to rotate about an axis of rotation 50 perpendicular to sprag longitudinal axis 52. In another preferred embodiment, the sprag cage 34 is positioned to retain sprags 32 at a uniform spacing within the radial cavity 42 in a fixed relationship to the sprag cage 34.

In one embodiment, the sprag cage 34 further has at least one retaining ring 54 positioned to retain sprags 32 at a uniform spacing within the radial cavity 42 and provide a fixed point for sprags 32 to rotate about an axis of rotation 50 perpendicular to the sprag longitudinal axis 52. During rotation of the clutch 14, the sprag cage 34 allows for sprags 32 to rotate and engage the inner race 24 and the outer race 28.

In one embodiment, the inner race 24 and the plurality of sprags 32 are of the same material and/or of materials having similar CTEs. In another embodiment, the plurality of sprags 32 and the outer race 28 are of the same material or are of materials having similar CTEs. Preferably, sprag cage 34 and, when used, the retaining ring 54 are of materials having a similar CTE to the plurality of sprags 32.

FIG. 4 illustrates clutch 14 with a plurality of sprags 32 wedged between the outer surface 36 of the inner race 24 and the inner surface 38 of the outer race 28. As discussed above, the different CTEs allow the sprags 32 to expand or contract relative to either the inner race 24 or the outer race 28, when the clutch 14 is subjected to a temperature change. This expansion or contraction causes the plurality of sprags 32 to close the gap 48 and wedge into the outer surface 36 of the inner race 24 and/or the inner surface 38 of the outer race 28. When engaged, there is no gap 48 between the outer surface 36 of the inner race 24 and the inner surface 38 of the outer race 28. The sprags 32 may be of the same material or of a material having a similar CTE as either the inner race 24 or the outer race 28. Examples are provided in the discussion on methods later in this description.

FIG. 5 illustrates clutch 14 with a gap 48 between the plurality of sprags 32 and both the outer surface 36 of the inner race 24 and the inner surface 38 of the outer race 28. However, gap 48 may only be between the outer surface 36 of the inner race 24 or the inner surface 38 of the outer race 28. Similar to description above regarding FIG. 4, the plurality of sprags 32 are of a material having a different CTE than one of the inner race 24 or the outer race 28. When subjected to a change in temperature, the inner race 24, the outer race 28, or the plurality of sprags 32 expand or contract.

The current invention works without additional temperature control based upon the different CTEs of the components. However, in some cases it may be desirable to introduce a change of temperature to engage or disengage the clutch 14. In such cases, the first temperature is the temperature of the clutch 14 where it is engaged or disengaged. The second temperature is the result of a temperature change and where the clutch 14 is disengaged or engaged, whichever is opposite of the clutch 14 at the first temperature.

A heat exchange system 56 may be used with the clutch 14 to provide cooling or heating to the inner race 24, the sprags 32, and/or the outer race 28. The heat exchange system 56 is used to subject the clutch 14 to a second temperature. If used, the heat exchange system 56 is associated, affixed to, or in contact with the clutch 14. The heat exchange system 56 provides cooling or heating to the inner race 24, the plurality of sprags 32, and/or the outer race 28, wherein the heat exchange system 56 is used to subject the clutch 14 to a temperature change. If a heat exchange system 56 is used, the heat exchange system 56 changes the temperature of at least one of the inner race 24, the outer race 28, and/or the sprags 32. In one embodiment, the heat exchange system 56 cools only one of inner race 24, the sprags 32, and/or the outer race 28. In another embodiment, the heat exchange system 56 cools or heats only two of inner race 24, the sprags 32, and/or the outer race 28. In still another embodiment, the entire clutch 14 is cooled.

A method is provided for engaging or disengaging a clutch 14. The method comprises inputting a rotation force to a clutch 14. The method uses the clutch 14 detailed herein. The method further includes operating the clutch 14 at a first temperature, wherein the clutch 14 is engaged or disengaged when the clutch 14 operates at the first temperature. The method includes operating the clutch 14 at a second temperature, wherein the clutch 14 disengages or engages at the second temperature, whichever is opposite from the first temperature.

In one embodiment, the method includes subjecting the clutch 14 to a change in temperature. The change in temperature causes the inner race 24, the sprags 32, or the outer race 28 to expand or contract between the first temperature and the second temperature. The change in temperature causes at least the plurality of sprags 32 to expand or contract based upon the CTE. In another embodiment, the plurality of sprags 32 and inner race 24 are of materials having the same or similar CTEs, and the change in temperature causes the plurality of sprags 32 and inner race 24 to expand or contract. In yet another embodiment, the plurality of sprags 32 and outer race 28 are of materials having the same or similar CTEs, and the change in temperature causes the plurality of sprags 32 and outer race 28 to expand or contract.

In an embodiment, the method further includes the creating or eliminating of the gap 48 between the plurality of sprags 32 and the outer race 28 when the plurality of sprags 32 and the outer race 28 are of materials having different CTEs. When the clutch 14 changes from the first temperature to the second temperature, the plurality of sprags 32 and the outer race 28 move away from each other to create the gap 48 or move towards each other to eliminate the gap 48. Alternatively, when the clutch 14 changes from the first temperature to the second temperature, the plurality of sprags 32 and the inner race 24 move away from each other to create the gap 48 or move towards each other to eliminate the gap 48.

The method further comprises disengaging the clutch 14 by creating the gap 48 and engaging the clutch 14 by eliminating the gap 48. The clutch 14 is disengaged when the gap 48 is between the plurality of sprags 32 and the inner race 24, the outer race 28, or both the inner race 24 and outer race 28. The clutch 14 is engaged when the plurality of sprags 32 contact the inner race 24 and the outer race 28.

When the clutch 14 is engaged, the method further comprises, outputting the rotation force from the clutch 14 as a torque input to a driven member such as an engine 12 or a drivetrain.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) according to this disclosure.

What is claimed is:

1. A clutch comprising:
  an inner race;
  an outer race spaced from the inner race and forming a radial cavity between the races;
  a plurality of sprags disposed in the radial cavity, wherein the sprags have a different coefficient of thermal expansion (CTE) from the inner race, the outer race, or both races; and
  a sprag cage positioned to retain the sprags at a uniform spacing within the radial cavity;
  wherein when the clutch is at a first temperature a gap exists between the sprags and the inner race, between the sprags and the outer race, or between the sprags and both races, and the clutch is disengaged; and
  wherein when the clutch is at a second temperature the sprags are in contact with both the races, and the clutch is engaged.

2. The clutch of claim 1, wherein the first temperature is greater than the second temperature.

3. The clutch of claim 1, wherein the second temperature is greater than the first temperature.

4. The clutch of claim 1, wherein the sprags are each of a same material selected from the group consisting of a metal, a composite, a ceramic, and combinations thereof.

5. The clutch of claim 1, wherein the sprags are of a material having a similar CTE as a material of either the inner race or the outer race.

6. The clutch of claim 1, wherein the sprags and the sprag cage are of a material having a similar CTE.

7. The clutch of claim 1, further comprising a heat exchange system associated with the clutch, the heat exchange system configured to cool or heat the inner race, the plurality of sprags, and/or the outer race, wherein the heat exchange system is capable of subjecting the clutch to a temperature change.

8. A method of engaging and disengaging a clutch, the method comprising:
  inputting a rotation force to the clutch, the clutch comprising:
    an inner race;
    an outer race;
    a radial cavity between the inner and outer races;

a plurality of sprags disposed in the radial cavity between the inner and outer races, wherein the sprags have a different coefficient of thermal expansion (CTE) from the inner race, the outer race, or both the inner and outer races;

a sprag cage positioned to retain each of the sprags at a uniform spacing within the radial cavity;

operating the clutch at a first temperature, wherein the clutch is disengaged when the clutch operates at the first temperature; and operating the clutch at a second temperature, wherein the clutch is engaged at the second temperature.

9. The method of claim 8, wherein the method includes subjecting the clutch to a change in temperature, wherein the change in temperature causes the clutch to change between the first temperature and the second temperature.

10. The method of claim 9, further comprising eliminating a gap between the sprags and the outer race when the sprags and the outer race have different CTEs.

11. The method of claim 10, wherein eliminating the gap occurs when the clutch changes from the first temperature to the second temperature and the sprags expand with the temperature change toward the outer race until the sprags are in contact with the inner and outer races.

12. The method of claim 10, wherein eliminating the gap occurs when the clutch changes from the first temperature to the second temperature and the sprags expand with the temperature change toward the inner race until the sprags are in contact with the inner and outer races.

13. The method of claim 10, further comprising engaging the clutch by eliminating the gap, wherein the clutch is engaged when the sprags contact the inner and outer races.

14. An aircraft having a clutch comprising:
at least one engine affixed to the aircraft and operably coupled to a drivetrain;
the clutch coupling the at least one engine to the drivetrain, the clutch further comprising:
an inner race;
an outer race;
a radial cavity between the inner and outer races;
a plurality of sprags disposed in the radial cavity between the inner and outer races, wherein the sprags have a different coefficient of thermal expansion (CTE) from the inner race, the outer race, and/or both the inner and outer races; and
a sprag cage positioned to retain the sprags at a uniform spacing within the radial cavity;
wherein when the clutch is at a first temperature a gap exists between the sprags and the inner race, between the sprags and the outer race, or between the sprags and both races, and the clutch is disengaged; and
wherein when the clutch is at a second temperature the sprags are in contact with both the races, and the clutch is engaged.

15. The aircraft of claim 14, wherein the first temperature is greater than the second temperature.

16. The aircraft of claim 14, wherein the second temperature is greater than the first temperature.

17. The aircraft of claim 14, wherein the sprags are each of a same material selected from the group consisting of a metal, a composite, a ceramic, and combinations thereof.

18. The aircraft of claim 14, wherein the sprags are of a material having a similar CTE as a material of either the inner race or the outer race.

19. The aircraft of claim 14, wherein the sprags and the sprag cage are of a material having a similar CTE.

20. The aircraft of claim 14, further comprising a heat exchange system associated with the clutch, the heat exchange system positioned to provide cooling or heating to the inner race, the plurality of sprags, and/or the outer race, wherein the heat exchange system is capable of subjecting the clutch to a temperature change.

* * * * *